(12) United States Patent
Engelen et al.

(10) Patent No.: US 10,455,668 B2
(45) Date of Patent: Oct. 22, 2019

(54) METHOD OF CONTROLLING LIGHTING DEVICES

(71) Applicant: PHILIPS LIGHTING HOLDING B.V., Eindhoven (NL)

(72) Inventors: Dirk Valentinus René Engelen, Heusden-Zolder (BE); Alexander Henricus Waltherus Van Eeuwijk, Eindhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/115,785

(22) PCT Filed: Jan. 15, 2015

(86) PCT No.: PCT/EP2015/050658
§ 371 (c)(1),
(2) Date: Aug. 1, 2016

(87) PCT Pub. No.: WO2015/113824
PCT Pub. Date: Aug. 6, 2015

(65) Prior Publication Data
US 2017/0013697 A1 Jan. 12, 2017

(30) Foreign Application Priority Data
Jan. 31, 2014 (EP) .................................. 14153373

(51) Int. Cl.
*H05B 37/02* (2006.01)
*G01C 21/20* (2006.01)

(52) U.S. Cl.
CPC ....... *H05B 37/0272* (2013.01); *G01C 21/206* (2013.01); *H05B 37/0227* (2013.01)

(58) Field of Classification Search
None
See application file for complete search history.

(56) References Cited

U.S. PATENT DOCUMENTS

| 2009/0002981 A1* | 1/2009 | Knibbe | ..................... G01S 5/14 362/233 |
| 2012/0217882 A1 | 8/2012 | Wong et al. | |

FOREIGN PATENT DOCUMENTS

| CN | 102202443 A | 9/2011 |
| DE | 202007002125 U1 | 8/2007 |
| JP | 2005285598 A | 10/2005 |
| JP | 2009252728 A | 10/2009 |
| JP | 2010003469 A | 1/2010 |

(Continued)

OTHER PUBLICATIONS

Hodes, Todd D., et al., "Composable AD HOC Location-Based Services for Heterogeneous Mobile Clients," Wireless Networks 5 (1999) (17 Pages).

*Primary Examiner* — Douglas W Owens
*Assistant Examiner* — Jianzi Chen
(74) *Attorney, Agent, or Firm* — Meenakshy Chakravorty

(57) ABSTRACT

A method of controlling lighting devices (4) via input from a mobile device (1), involving the operations of:
upon movement of the mobile device, while being wirelessly connected with an influencing lighting device, obtaining movement direction data generated by the mobile device (1); and
providing the movement direction data for determining a next lighting device to be controlled.

17 Claims, 2 Drawing Sheets

(56) References Cited

FOREIGN PATENT DOCUMENTS

| | | |
|---|---|---|
| WO | 2007072314 A1 | 6/2007 |
| WO | 2008117105 A1 | 10/2008 |
| WO | 2008152545 A1 | 12/2008 |
| WO | 2009003279 A1 | 1/2009 |
| WO | 2011117799 A1 | 9/2011 |
| WO | 2012085794 A1 | 6/2012 |
| WO | 2013080809 A1 | 6/2013 |

* cited by examiner

METHOD OF CONTROLLING LIGHTING DEVICES

CROSS-REFERENCE TO PRIOR APPLICATION

This application is the U.S. National Phase application under 35 U.S.C. § 371 of International Application No. PCT/EP2015/050658, filed on Jan. 15, 2015, which claims the benefit of European Patent Application No. 14153373.7, filed on Jan. 31, 2014. These applications are hereby incorporated by reference herein.

FIELD OF THE INVENTION

The present invention relates to a method of controlling lighting devices by means of a mobile device.

BACKGROUND OF THE INVENTION

In order to provide a lighting system with the potential of individual control, and also energy savings, it is desirable to have the lighting system controllable from a mobile device which an ordinary user usually carries, such as a smart phone, a tablet, or any other mobile device, which is arranged for local area wireless communication, such as Bluetooth®, Zigbee®, or the like.

One example of such a known lighting control is disclosed in WO2007/072314, where the mobile device transmits a signal, which is received by the lighting devices, and measured as regards signal strength or time of flight, which can be used to determine the distance between the mobile device and the lighting devices. Each lighting device then returns a signal to the mobile device including an ID of the lighting device, its location, and the measured value of the signal transmitted by the mobile device. From the signals received, the mobile device determines its own location and the distances to the lighting devices, which have responded. The mobile device determines the nearest lighting device and controls its light output.

However, in addition to control the currently nearest lighting device it would be desired to be able to control the lighting device which is about to become the nearest one when the mobile device, i.e. the user carrying it, moves around.

SUMMARY OF THE INVENTION

It would be advantageous to provide a solution which makes it possible to determine which is the next lighting device to become the lighting device that influences the user the most.

To better address this concern, in a first aspect of the invention there is presented a method of controlling lighting devices via input from a mobile device, comprising, upon movement of the mobile device, while being wirelessly connected with an influencing lighting device, obtaining movement direction data generated by the mobile device; and providing the movement direction data for determining a next lighting device to be controlled.

By using the movement direction data which is already generated by the mobile device itself, when it has established a wireless connection with a lighting device, it is possible to estimate which lighting device in the surrounding environment is soon to become the one influencing the user, and which should therefore be controlled. For instance this can be used to turn on, or dim up the light of a lighting device ahead of the user before the user reaches the area illuminated primarily by that lighting device. It is an advantage to use the already generated movement direction data of the mobile device in comparison to having to estimate the direction by means of other kinds of measurements.

The expression "influencing lighting device" is to be understood as the lighting device that contributes most to the illumination of the location where the mobile device is. The mobile device can be any mobile device having the capabilities defined herein, e.g. a smart phone or other mobile phone, a tablet, or the like, or a wearable device such as a headset, a smart watch, smart glasses, etc.

In accordance with an embodiment of the method it comprises performing a handover of the control of a lighting device to the next lighting device to be controlled. When the handover has been done, the next lighting device is thus controlled.

In accordance with an embodiment of the method, the handover is performed upon detecting the presence of the mobile device within an influencing area of the next lighting device to be controlled. An alternative is to base the handover on the position of the mobile device relative to the position of the next lighting device.

In accordance with an embodiment of the method, the operation of obtaining position data comprises generating the position data by means of a position sensor of the mobile device.

In accordance with an embodiment of the method, the movement direction data is generated by means of a direction sensor of the mobile device.

In accordance with an embodiment of the method, it further comprises obtaining position data, which defines the position of the mobile device. This can be done in several ways. According to one embodiment the position data is generated by means of a position detector of the mobile device.

In accordance with an embodiment of the method, it further comprises determining a present influencing lighting device of the lighting system by means of the position data, and controlling the presently influencing lighting device.

In accordance with an embodiment of the method, it comprises determining, by means of a lighting system comprising several lighting devices, the influencing lighting device of the lighting system on basis of the position data.

In accordance with an embodiment of the method, the operation of determining, on basis of the movement direction, a next lighting device, which is to be controlled, constitutes determining, by means of the lighting system, a next lighting device to be controlled after the influencing lighting device.

In accordance with an embodiment of the method it comprises obtaining, at the mobile device, information about lighting devices in the surroundings of the influencing lighting device; and determining, on basis of the movement direction data, the lighting device which is to be controlled, by means of the mobile device. This operation as many of the other operations of the present method can be performed at either the mobile device or the lighting device/lighting system, in the latter case possibly involving a central controller. The alternatives are associated with different advantages.

According to the invention there is additionally provided a computer program product to be run on a mobile device, comprising computer program portions for executing appropriate parts of the method as described above.

BRIEF DESCRIPTION OF THE DRAWINGS

The invention will now be described in more detail and with reference to the appended drawings in which.

DESCRIPTION OF EMBODIMENTS

Figure 1:
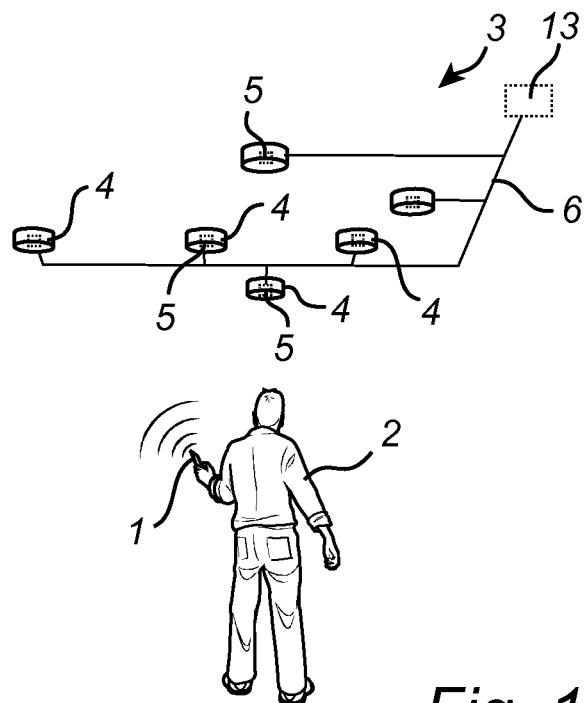
FIG. 1 is a schematic illustration of an environment where the method according to the present invention is applied.

An example environment for the method to be implemented, as shown in FIG. 1, includes a mobile device 1 carried by a user 2, and a lighting system 3 arranged in a room. The lighting system comprises several lighting devices 4, which are capable of communicating with mobile devices, with each other or both. At least one of the lighting devices 4, or a common controller, etc., is provided with a communication unit 5 for communicating with the mobile device 1. However, the method can be applied to any lighting system, in house or outdoor, which is provided with such a communication capability. Below a few examples of how the communication can be arranged will be described. According to this first example, each lighting device 4 comprises a communication unit 5, and they are interconnected via a communication system 6 for exchanging information and for controlling the lighting system. In FIG. 1 the communication system 6 is symbolically illustrated by lines connecting the lighting devices 4. However, the lines are just meant to indicate a communication system of any appropriate kind, which can be wired or wireless.

Figure 2:
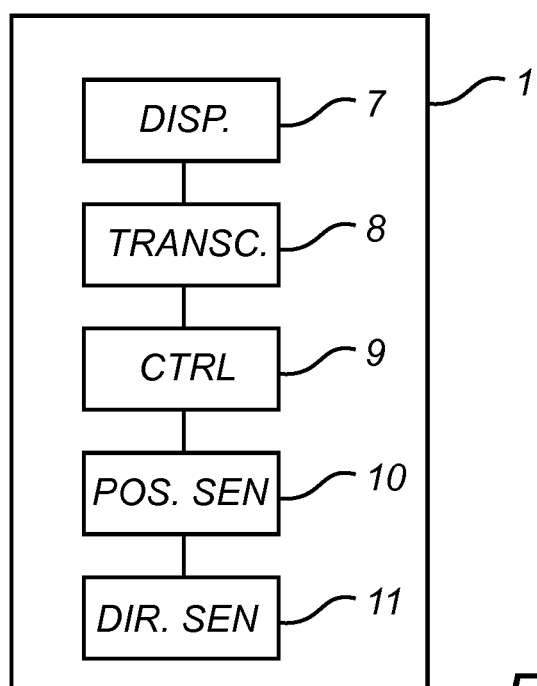
FIG. 2 is a schematic block diagram of a mobile device.

As shown in FIG. 2, the mobile device 1 comprises a display 7, a transceiver 8, for local communication of any appropriate kind as exemplified above, a controller 9, a position sensor 10, and a direction sensor 11. The movement direction data generated by the direction sensor 11, for instance, can be given related to an absolute direction, such related to the magnetic North and the direction of gravity.

According to a first embodiment of the method of controlling lighting devices via input from a mobile computing device, it is assumed that the lighting system 3 has been previously commissioned to establish the absolute or relative positions of the lighting devices 4. For example, the positions have been communicated to, and stored at, the very lighting devices 4, or the positions have been associated to the respective identifiers (ID) of the lighting devices 4, e.g. communicated via Coded light to the lighting devices 4, or to respective identifiers that represent the lighting devices 4 in a communications network. There are several known commissioning methods which can be employed here.

Figure 3:
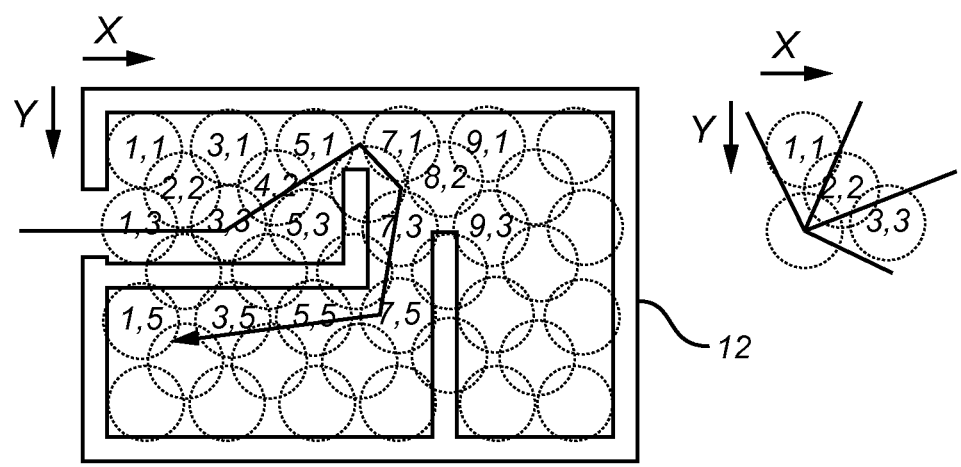
FIG. 3 is a schematic illustration of dominant areas for lighting devices.

Furthermore, there are existing methods to derive the neighbors of lighting devices. More particularly, what is important here is to derive the neighboring light effects. An illustrating example of how the different lighting devices influence the illumination of an in house environment is shown in FIG. 3. This figure shows a map of a small building and all the lighting devices in a regular grid. Using a known method, a portable commissioning device is carried through the building, or even an automated commissioning vehicle, which drives around and which comprises a commissioning device, can be used. Thereby, the building is scanned for light effects, and the ID of each lighting device is derived and associated to the position of the commissioning device. The commissioning device can detect the overlap of light effects, it can detect the contribution of the lighting devices in different positions and it can make an assumption on positions where the effect of a lighting device is dominant. The approximate areas which the lighting devices illuminate are represented in the figure by the circles, numbered according to a coordinate system. So, for every location in the room, a single lighting device, or several lighting devices, can be detected which has a dominant effect at that location.

The general operations of the method are: establishing a wireless connection between the mobile device 1 and the lighting system 3, and more particularly an influencing lighting device thereof; upon movement of the mobile device 1, obtaining movement direction data generated by means of the mobile device 1, i.e. by the direction sensor 11; and providing the movement direction data for determining a next lighting device 4 to be controlled. The different operations can be performed by different devices involved, and a few examples will be described below. For instance, the mobile device is arranged to, upon movement of the mobile device and while being wirelessly connected with an influencing lighting device, generate movement direction data, and provide the movement direction data for determining a lighting device to be controlled.

According to the first embodiment of the method, the operation of establishing a wireless connection between the mobile device 1 and the lighting system 3 includes the following. When the user 2, and thus the mobile device 1 carried by the user, enters the building 12 the controller 9 of the mobile device 1 is configured to automatically connect to the open network of the lighting system. When ZigBee or WiFi is used, the mobile device 1 becomes part of this network. Position data for the mobile device 1 is obtained. The operation of obtaining position data is based on employment of the position sensor 10 of the mobile device 1. The coordinate system is the same as used in the commissioning device, so the position data generated by the position sensor 10 can be associated to the light effect of a single lighting device 4. The ID of the influencing lighting device 4 is then transmitted to the mobile device 1. This can be done spontaneously by the lighting system 3 when the mobile phone 1 becomes part of the communication network. In that case, the position of the lighting device 4 is requested by a node or controller 13 (indicated by broken lines in FIG. 1 since optional) of the network. The lighting device 4 most influencing the position of the mobile device 1 makes connection with, i.e. establishes a communication with, the mobile device 1. As an alternative, the transmission of the ID can be made on request of the mobile device 1 sent to the communication network 6 of the lighting system 3. The position of the mobile device 1 is included in the request. The lighting device 4 influencing (most influencing) the position is communicated to the mobile device 1, which makes connection to this lighting device 4.

Figures 4A, 4B:
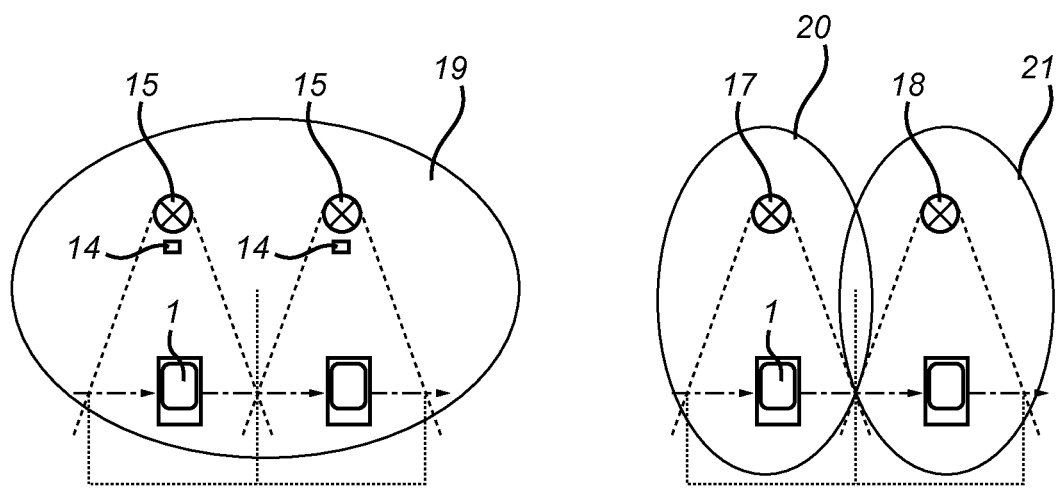
FIGS. 4a and 4b illustrate control handover different lighting devices according to the method.

As an alternative to determining the position, each lighting device 4, or at least those located at possible entrances of the environment, has a presence detector 14, as shown in FIG. 4a. The lighting device 4 first sensing the mobile device 1 by means of its presence detector 14 connects with the mobile device 1 and becomes the influencing lighting device 4.

After being paired with the influencing lighting device 4, by any of the methods described above, a light setting that is related to the mobile device 1 is created. This setting is based on, for instance, one or more of:

Preferences of the user 2 stored or derived in the mobile device 1. This can be for instance that the user 2 wants to be accompanied by an intense bluish light effect. It should be noted that preferences can also be generated by an application on the mobile device, such as to use light for signage, way finding, etc.

Possibilities of the influencing lighting device 4. For example, it can be limited to generating cold and warm white light.

Limits set by the lighting interface infrastructures. As an example, intensity can be limited by the infrastructure during certain hours, e.g. to limit energy consumption.

A follow-me command activating a follow-me mode of the lighting system 3. The command can be input to the mobile device 1 by the user 2 via voice input, key input, by making a pre-defined gesture with the mobile device 1, etc.

Measurements of the ambient lighting level, as performed by, for example, the mobile device 1 or the lighting device 4.

The creation of the light setting can be done in the lighting device 4, while taking preferences and limits into account, or in the mobile device 1, also taking preferences, possibilities and limits into account. As regards the follow-me mode, it can be for instance leaving a lighting trace along the path that the user moves, creating a secondary lighting effect in a surrounding area, or a list of rooms where such a follow-me light is desired.

There is an option not to make any light settings of the first influencing lighting device, but to act on the next lighting device to be controlled, while in most cases there will be an interest of adjusting also the lighting device 4 which first establishes connection with the mobile device 1.

When the mobile device 1 moves, a movement direction is derived by means of the direction sensor 11. The movement direction data is communicated to the influencing lighting device 4, i.e. the lighting device 4 to which the mobile device is 1 currently connected. This lighting device 4 uses the movement direction data to derive the ID of one or multiple neighboring lighting devices 4 that will have a dominant effect on the mobile device 1 in the direction it is moving, and is thus next to be controlled. The ID(s) is transmitted to the mobile device 1 and it can be used to set up a new communication path. For ZigBee®, this simply means that the mobile device 1 remains in the same communication network 6, but a message is sent to a new lighting device 4. The mobile device 1 will then transmit its preferences to the new lighting device 4, and together with its capabilities and possible infrastructure limitations, a light setting for the new lighting device 4 is determined. As an alternative, position data previously obtained, or new position data, defining the position of the mobile device 1, is additionally used to determine the next lighting device 4 to be controlled. The information held by a single lighting device about positions of other lighting devices varies depending on the structure of the lighting system and other factors. According to one example each lighting device 4 holds no absolute position information, but holds ID information about the closest neighbor in each direction, and is able to provide information about the next lighting device to be controlled on basis of the movement direction data.

An example of a route that the mobile device 1 travels through the building 12 is indicated in FIG. 3 by a line ended with an arrow, which line passes a number of areas where different lighting devices 4 are the most influencing. Thus, the communication with the mobile device 1 is established with the lighting device (1,3) at entrance, and then, in time sequential order, with lighting devices (3,3), (4,2), (5,1), (7,1), (7,3), (7,5), (5,5), etc.

Additionally, other properties of the movement may be determined, such as the speed of the movement and speed changes. As an example, a higher speed could lead to having the light effect influencing a larger area.

According to a second embodiment, the mobile device 1 is able to act as the device which performs the calculations, and determines both which lighting device to connect to in the first instance, and which one to choose as a next lighting device when the mobile device 1 moves. This is done by requesting and storing information about the lighting system 3 and the individual lighting devices 4 when entering the building 12.

The very operation of changing from controlling a current lighting device 15, 17 to controlling the light setting of the next lighting device 16, 18 can be referred to as a handover. Typically, the handover involves a handover of the very communication between the mobile device 1 and the lighting device from communicating with the current lighting device 15, 17 to communicating with the next lighting device 16, 18, although it would also be possible that the control settings are distributed to the next lighting device 16, 18 within the lighting system 3. When the handover is executed depends on the position of the mobile device 1, and the rules defined for handover in the lighting system 3. This decision can be made by the next lighting device 16, 18, when the mobile device 1 is detected in the influence area or even before that, or when a presence detector 14, which monitors the influence area, is triggered, as illustrated in FIGS. 4a and 4b.

At handover or later, the light setting of the previous influencing lighting device 15, 17 can change to a default setting, or the lighting device can simply wait for a new user with a new setting.

When the same lighting device 4 is influencing multiple users, i.e. multiple mobile devices 1, an average or dominant light setting can be derived from the preferences of the users.

Some types of network architectures can be considered. According to one embodiment, the lighting devices 4, 15-18 are part of a common local network 19, e.g. ZigBee®, and the mobile device 1 becomes part of the network when entering the environment, e.g. the building 12. While moving, the mobile device 1 remains in the network and during handover it only has to change the destination address when sending messages.

According to another embodiment, every lighting device 4, 17, 18 has a local network 20, 21, and when moving, the mobile device 1 receives the parameters for connecting to the expected next lighting device 18, and its associated network 21, while moving in the influence area of the current lighting device 17, and within its network 20.

According to still another embodiment a mix of both is possible. In this case there are lighting devices from several groups with different kinds of networks. When moving under lighting devices in the same group, the mobile device stays in the network and only has to change the destination of the messages. When moving to another group, a new network connection has to be established during handover.

It should also be noted that the direction sensor 11, as an alternative to being able to generate movement direction data by direct measurements, can be arranged to use consecutive position data and calculate a movement direction on basis of differences of multiple positions in time. The position data can be self-generated or received from the position sensor 10.

As an alternative to a commissioning method for the lighting system, every lighting device has a directional antenna. These types of antennas are known in mobile telephone networks, and have the advantage to emit and receive the radiation power in a certain direction. This principle can be used in a lighting system to locate the neighboring light nodes, their estimated distance, via the received radiation power, and angle, determined as the beam angle in which the reception is the best. By doing this, every lighting device can create a local map. When receiving the direction information of a mobile device, the lighting device can respond with the identification of the next light node.

Another way to build up a local map of neighboring light sources is to equip every light node with multiple directional light sensors, thereby enabling them to pick up the coded light identifiers from neighbors in the corresponding direction.

As described above, the mobile device is used as the medium to locate the user and to communicate with lighting devices or a lighting infrastructure. Typical situations/environments where the method is applicable are for controlling lighting at home, controlling city lighting, lighting in an office environment, at conference premises, and in vehicles moving in a city.

The method can be used to either create more light on the location where the mobile device is currently located, or to create less light at this location. The latter can be interesting for instance if a user wants to avoid glare on the display of the mobile device.

The operations executed by the mobile phone can be implemented as a computer program product. For instance it can be a downloadable app for smart phones and tablets. Similarly, the operations of the method performed by the lighting devices, or a common controller, or the like can be implemented as a computer program product.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling lighting devices via input from a mobile device, comprising:
   upon movement of the mobile device, while being wirelessly connected with a present lighting device having a dominant light effect at a current location of the mobile device, obtaining movement direction data generated by a direction sensor of the mobile device, said movement direction data indicative of a direction of said movement of the mobile device and said direction sensor configured to measure said direction of said movement to generate said movement direction data;
   providing the movement direction data for determining an expected next lighting device to be controlled based on the movement direction data, said expected next lighting device to be controlled having a dominant light effect in said movement direction;
   performing a handover of the control of the present lighting device to the expected next lighting device to be controlled;
   controlling a lighting effect produced by the expected next lighting device based on said handover; and
   determining a speed of said movement, wherein the controlling of said lighting effect is implemented such that an increased value of said speed results in an increased area influenced by said lighting effect.

2. The method according to claim 1, said providing the movement direction data for determining the expected next lighting device to be controlled, constituting determining the expected next lighting device to be controlled after the present lighting device.

3. The method according to claim 1, comprising obtaining position data, which defines the position of the mobile device.

4. The method according to claim 3, further comprising:
   determining the present lighting device by means of the position data; and
   controlling the present lighting device.

5. The method according to claim 3, said obtaining position data comprising generating the position data by means of a position sensor of the mobile device.

6. The method according to claim 3, comprising:
   determining the present lighting device of a lighting system comprising several lighting devices on basis of the position data.

7. The method according to claim 3, comprising performing said handover upon detecting the presence of the mobile device within an influencing area of the expected next lighting device to be controlled.

8. The method according to claim 3, comprising performing said handover on basis of the position of the mobile device relative to the position of the expected next lighting device to be controlled.

9. The method according to claim 3, further comprising measuring said direction of said movement by said direction sensor.

10. The method according to claim 1, further comprising:
    obtaining, at the mobile device, information about lighting devices in the surroundings of the present lighting device; and
    determining, on basis of the movement direction data, the expected next lighting device which is to be controlled, by means of the mobile device.

11. The method according to claim 1, comprising:
    determining, on basis of the movement direction data, the expected next lighting device which is to be controlled, by means of the present lighting device.

12. A non-transitory computer readable medium comprising computer program product to be run on a mobile computing device, the computer program product being adapted to execute the method according to claim 1.

13. The method according to claim 1, further comprising determining the expected next lighting device to be controlled based on the movement direction data.

14. The method according to claim 1, further comprising measuring said direction of said movement by said direction sensor.

15. The method according to claim 14, further comprising determining the expected next lighting device to be controlled based on the movement direction data.

16. A mobile device for controlling lighting devices via commands input from the mobile device, said mobile device comprising a transceiver for local communication with the lighting devices, and a direction sensor, the mobile device being arranged to:

upon movement of the mobile device and while being wirelessly connected with a present lighting device having a dominant light effect at a current location of the mobile device, generate movement direction data, said movement direction data indicative of a direction of said movement of the mobile device and said direction sensor configured to measure said direction of said movement to generate said movement direction data;

provide the movement direction data for determining an expected next lighting device to be controlled based on the movement direction data, said expected next lighting device to be controlled having a dominant light effect in said movement direction;

perform a handover of the control of the present lighting device to the expected next lighting device to be controlled;

control a lighting effect produced by the expected next lighting device based on said handover; and determine a speed of said movement, wherein the controlling of said lighting effect is implemented such that an increased value of said speed results in an increased area influenced by said lighting effect.

17. The mobile device of claim 16, wherein the mobile device is configured to control a light effect produced by the expected next lighting device in response to said determining.

* * * * *